(12) United States Patent
Hori (10) Patent No.: US 12,462,344 B2
(45) Date of Patent: Nov. 4, 2025

(54) INFORMATION PROCESSING METHOD AND INFORMATION PROCESSING APPARATUS

(71) Applicant: TOYOTA JIDOSHA KABUSHIKI KAISHA, Toyota (JP)

(72) Inventor: Tatsuro Hori, Edogawa-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 313 days.

(21) Appl. No.: 18/355,555

(22) Filed: Jul. 20, 2023

(65) Prior Publication Data

US 2024/0037711 A1    Feb. 1, 2024

(30) Foreign Application Priority Data

Aug. 1, 2022  (JP) .................. 2022-122964

(51) Int. Cl.
| | | |
|---|---|---|
| *G06T 5/50* | (2006.01) | |
| *G06T 5/00* | (2024.01) | |
| *G06T 5/80* | (2024.01) | |
| *G06T 7/11* | (2017.01) | |
| *G06T 7/55* | (2017.01) | |
| *G06T 7/73* | (2017.01) | |

(52) U.S. Cl.
CPC .................. *G06T 5/50* (2013.01); *G06T 5/80* (2024.01); *G06T 7/11* (2017.01); *G06T 7/55* (2017.01); *G06T 7/73* (2017.01); *G06T 2207/10028* (2013.01); *G06T 2207/20132* (2013.01)

(58) Field of Classification Search
CPC ..... G06T 5/50; G06T 7/55; G06T 7/11; G06T 7/73; G06T 5/80; G06T 2207/10028; G06T 2207/20132
See application file for complete search history.

(56) References Cited

U.S. PATENT DOCUMENTS

| | | | | |
|---|---|---|---|---|
| 9,218,113 | B2 * | 12/2015 | Kudo | .................. H04N 13/398 |
| 9,256,345 | B2 * | 2/2016 | Lee | ..................... H04N 21/4852 |
| 10,423,220 | B2 * | 9/2019 | Osada | ..................... G06F 3/011 |
| 10,679,102 | B2 * | 6/2020 | Kajiwara | ................ G06T 7/246 |
| 11,308,579 | B2 * | 4/2022 | Wang | ..................... G06T 7/593 |
| 11,348,265 | B1 * | 5/2022 | Nielsen | ..................... G06T 7/55 |
| 12,112,425 | B2 * | 10/2024 | Tamura | ............ H04N 21/23418 |
| 2011/0228043 | A1 | 9/2011 | Masuda et al. | |

(Continued)

FOREIGN PATENT DOCUMENTS

| | | |
|---|---|---|
| CN | 113033243 A | 6/2021 |
| JP | 2009-200579 A | 9/2009 |
| JP | 2011-199478 A | 10/2011 |

(Continued)

*Primary Examiner* — Gregory M Desire
(74) *Attorney, Agent, or Firm* — Oliff PLC (57) ABSTRACT

An information processing method includes, for each of multiple images having an overlapping area, the multiple images being obtained by capturing a subject with respective multiple imagers whose shooting ranges overlap each other in part, detecting a position of a feature point of the subject in the overlapping area, trimming, at a position of a virtual line, an image of each of the multiple images in which the virtual line based on the position of the feature point is included in the overlapping area, and merging the multiple images to generate a single composite image.

9 Claims, 5 Drawing Sheets

(56) References Cited

U.S. PATENT DOCUMENTS

2018/0189975 A1 7/2018 Inada et al.
2020/0186729 A1 6/2020 Akao

FOREIGN PATENT DOCUMENTS

| JP | 2011-210118 A | 10/2011 |
| JP | 2012-244432 A | 12/2012 |
| JP | 2012244249 A | 12/2012 |
| JP | 2016-208306 A | 12/2016 |
| JP | 2021-189629 A | 12/2021 |
| WO | 2017033853 A1 | 3/2017 |
| WO | 2019/026598 A1 | 2/2019 |

\* cited by examiner

INFORMATION PROCESSING METHOD AND INFORMATION PROCESSING APPARATUS

CROSS-REFERENCE TO RELATED APPLICATION

This application claims priority to Japanese Patent Application No. 2022-122964, filed on Aug. 1, 2022, the entire contents of which are incorporated herein by reference.

TECHNICAL FIELD

The present disclosure relates to an information processing method and an information processing apparatus.

BACKGROUND

Apparatuses that composite two images obtained by photography based on a result of detecting an overlapping area in the two images are known (see, for example, Patent Literature (PTL) 1).

CITATION LIST

Patent Literature

PTL 1: JP 2011-199478 A

SUMMARY

When merging two images, a subject may be distorted in a merged portion between the images due to a difference in a shooting position or direction between the images.

It would be helpful to reduce distortion of a subject in a merged portion between images.

An information processing method according to an embodiment of the present disclosure includes:

for each of multiple images having an overlapping area, the multiple images being obtained by capturing a subject with respective multiple imagers whose shooting ranges overlap each other in part, detecting a position of a feature point of the subject in the overlapping area;

trimming, at a position of a virtual line, an image of each of the multiple images in which the virtual line based on the position of the feature point is included in the overlapping area; and merging the multiple images to generate a single composite image.

An information processing apparatus according to an embodiment of the present disclosure includes multiple imagers and a controller. The respective multiple imagers are configured to capture multiple images having an overlapping area with each other. The controller is configured to detect, for each of the multiple images captured by the respective multiple imagers, a position of a feature point of a subject in the overlapping area. The controller is configured to trim, at a position of a virtual line, an image of each of the multiple images in which the virtual line based on the position of the feature point is included in the overlapping area, and merge the multiple images to generate a single composite image.

According to the information processing method and information processing apparatus according to the embodiments of the present disclosure, distortion of a subject in a merged portion between images can be reduced.

DETAILED DESCRIPTION

<Example Configuration of Information Processing Apparatus 10>

Figure 1:
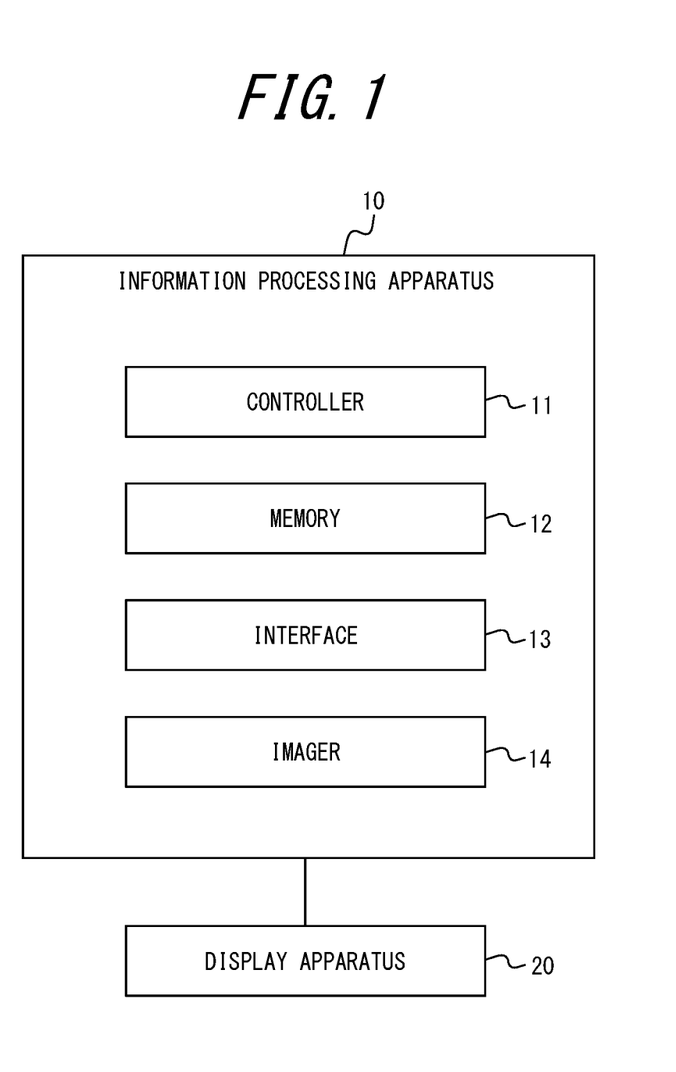
FIG. 1 is a block diagram illustrating an example configuration of an information processing apparatus according to an embodiment.

As illustrated in FIG. 1, an information processing apparatus 10 according to an embodiment includes a controller 11, a memory 12, an interface 13, and an imager 14. The information processing apparatus 10 is connected to a display apparatus 20, although not required. The information processing apparatus 10 may include the display apparatus 20.

The information processing apparatus 10 may be configured to include a personal computer (PC), such as a notebook PC, a desktop PC, or a tablet PC. The information processing apparatus 10 may be configured to include a portable terminal, such as a smartphone or tablet in the possession of a user. The information processing apparatus 10 is not limited to the above examples and may include various devices. Each component of the information processing apparatus 10 will be described below.

<Controller 11>

The controller 11 controls at least one component of the information processing apparatus 10. The controller 11 may be configured to include at least one processor. The "processor" is a general purpose processor, a dedicated processor specialized for specific processing, or the like in the present embodiment but not limited to these. The controller 11 may be configured to include at least one dedicated circuit. The dedicated circuit may include, for example, a field-programmable gate array (FPGA) or an application specific integrated circuit (ASIC). The controller 11 may be configured with the dedicated circuit instead of the processor, or may be configured with the dedicated circuit along with the processor.

<Memory 12>

The memory 12 stores any information to be used for operations of the information processing apparatus 10. The memory 12 may store a system program, an application program, or the like. The memory 12 may be configured to include, for example, semiconductor memory, magnetic memory, optical memory, or the like, but not limited to these, may also include various other types of memory. The memory 12 may function as, for example, a main memory, an auxiliary memory, or a cache memory. The memory 12 may be configured to include an electromagnetic storage medium, such as a magnetic disk. The memory 12 may be configured to include a non-transitory computer readable medium. The memory 12 may be included in the controller 11.

<Interface 13>

In the information processing apparatus 10, the interface 13 outputs information, data, or the like from the controller 11, and inputs information, data, or the like to the controller 11. The interface 13 may include a communication module configured to be communicable with other devices, such as other information processing apparatuses 10, either via a network or without a network. The communication module may be, for example, compliant with a mobile communication standard, such as the 4th Generation (4G) standard or the 5th Generation (5G) standard. The communication module may be compliant with a communication standard, such as a Local Area Network (LAN). The communication module may be compliant with a wired or wireless communication standard. The communication module is not limited to these examples and may be compliant with various communication standards. The interface 13 may be configured to be capable of connecting to an external communication module.

The network may be configured to include the Internet, at least one wide area network (WAN), at least one metropolitan area network (MAN), or any combination thereof. The network may be configured to include at least one wireless network, at least one optical network, or any combination thereof. The wireless network may be configured to include, for example, an ad hoc network, a cellular network, a wireless local area network (LAN), a satellite communication network, or a terrestrial microwave network.

The interface 13 may be configured to be compliant with a standard such as Universal Serial Bus (USB) or Bluetooth® (Bluetooth is a registered trademark in Japan, other countries, or both).

The interface 13 may be configured with an input device for accepting input of information, data, or the like from the user. The input device may be configured with, for example, a touch panel or touch sensor, or a pointing device such as a mouse. The input device may be configured with a physical key. The input device may be configured with an audio input device, such as a microphone. The interface 13 may be configured to capable of connecting to an external input device.

The interface 13 may be configured to include an output device that outputs information, data, or the like to the user. The output device may be configured to output, to the display apparatus 20, information or data to be displayed on the display apparatus 20, as described below. The output device may include, for example, an audio output device, such as a speaker, that outputs audio information, such as voice. The output device may include, for example, a vibration device, such as a vibrator, that outputs tactual information e.g. vibration. The output device is not limited to the above examples and may include various other devices. The interface 13 may be configured to be capable of connecting to an external output device.

<Imager 14>

The imager 14 may include an imaging device, such as a camera, that captures RGB images. The imager 14 may include a depth sensor that acquires depth images or a ranging device such as a stereo camera. The information processing apparatus 10 may acquire images or ranging data (depth data) from an external imaging device or ranging device via the interface 13. The functions of the imaging device or ranging device of the imager 14 may be included in the functions of the interface 13.

Figure 2:
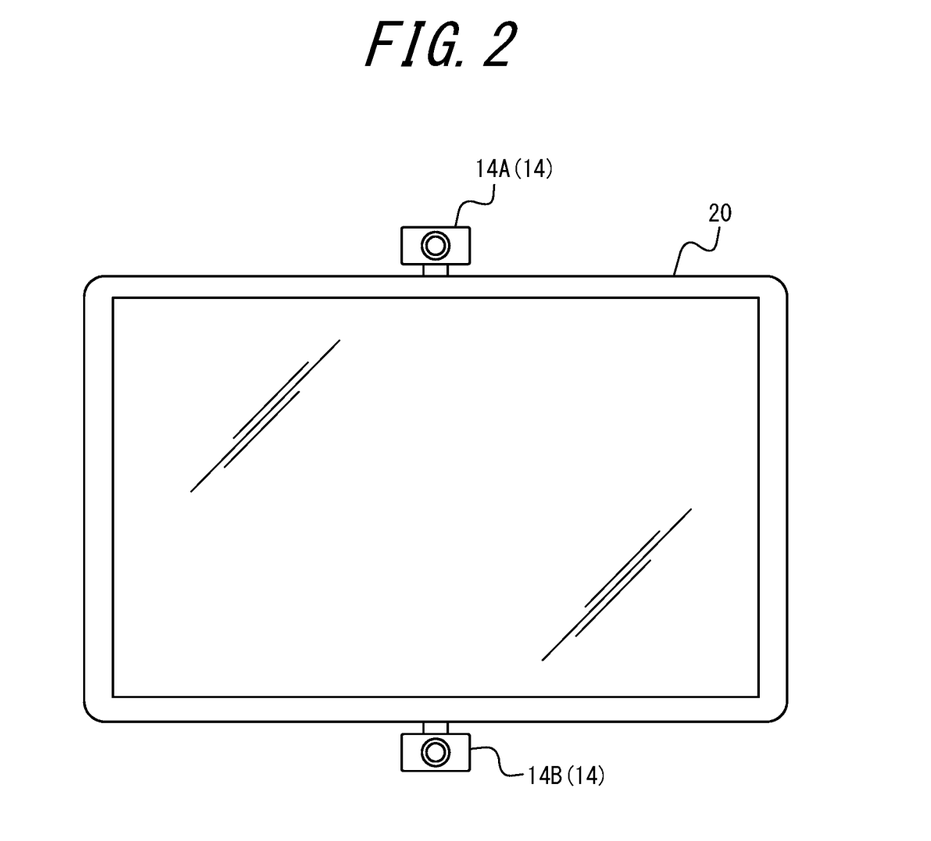
FIG. 2 is a diagram illustrating an example arrangement of imagers.

As illustrated in FIG. 2, the imager 14 includes a first imager 14A and a second imager 14B. The first imager 14A and the second imager 14B are installed on the top and bottom of a picture frame of the display apparatus 20, but not limited to this and may be installed in various ways. For example, the first imager 14A and the second imager 14B may be installed on either side of the display apparatus 20, or may be installed separately from the display apparatus 20. The imager 14 is not limited to two and may be three or more in number.

<Display Apparatus 20>

The display apparatus 20 is configured to display visual information such as images or text or graphics. The display apparatus 20 may be configured with, for example, a Liquid Crystal Display (LCD), an organic or inorganic Electro-Luminescence (EL) display, a Plasma Display Panel (PDP), or the like. The display apparatus 20 is not limited to the above displays and may be configured with various other types of displays. The display apparatus 20 may be configured with a light emitting device, such as a Light Emitting Diode (LED) or a Laser Diode (LD). The display apparatus 20 may be configured with various other devices.

(Example Operations of Information Processing Apparatus 10)

The information processing apparatus 10 captures multiple images of multiple portions of a user, as separate subjects, and composites the multiple images to generate an image that captures a large area of the user. This increases the degree of freedom of the position of the user to ensure that the entire user to be imaged as a subject is not out of a shooting range of the imager 14. The information processing apparatus 10 may operate to image the entirety of the user's face as a subject, or the user's upper body or entire body as a subject. Hereinafter, specific example operations of the information processing apparatus 10 will be described.

<Imaging by Imagers 14>

The information processing apparatus 10 includes multiple imagers 14. As illustrated in FIG. 2, the imagers 14 include a first imager 14A and a second imager 14B. In the present example operations, assume that the number of the imagers 14 is two.

Figure 3A:
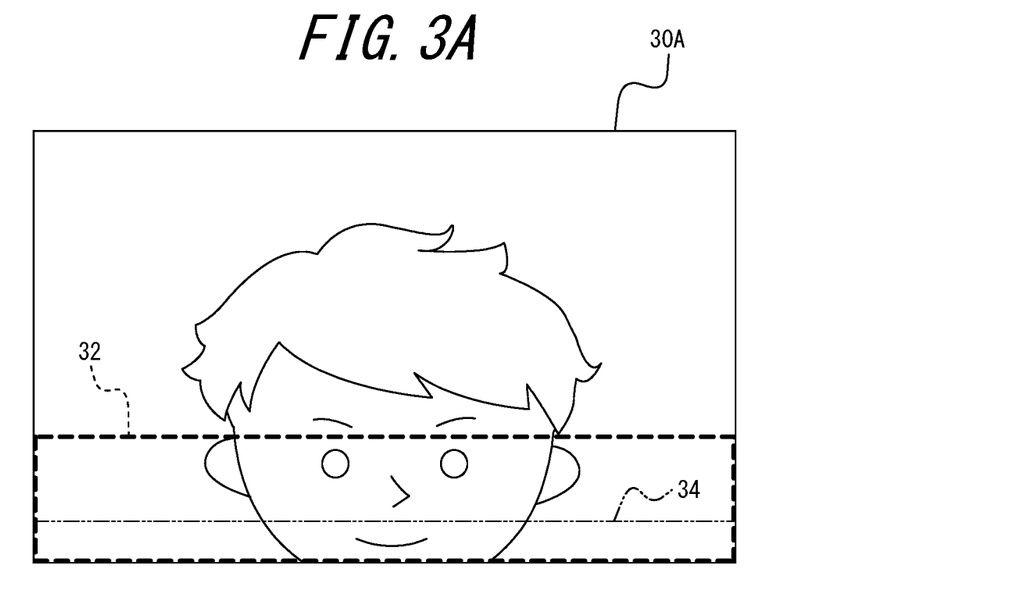
FIG. 3A is a diagram illustrating an example of a user image captured by a first imager.
Figure 3B:
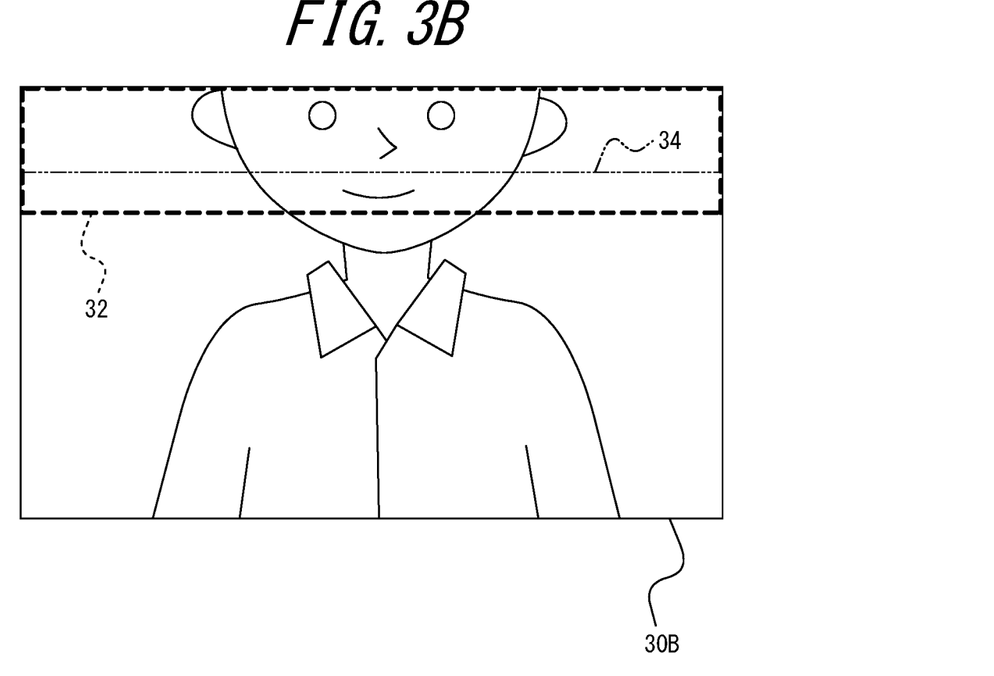
FIG. 3B is a diagram illustrating an example of a user image captured by a second imager.

The first imager 14A images a portion of an entire range that is intended to image a user as a subject, and generates a first user image 30A as illustrated in FIG. 3A. The second imager 14B images another portion of the entire range that is intended to image the user as the subject, and generates a second user image 30B as illustrated in FIG. 3B. In the example in FIG. 3A, an upper portion of the user's face is captured in the first user image 30A. In the example in FIG. 3B, a lower portion of the user's face is captured in the second user image 30B. In this example operations, the information processing apparatus 10 operates to capture the entirety of the user's face as a subject.

The respective shooting ranges of the first and second imagers 14A and 14B are set so that a portion of the user as the subject is included in part of the shooting ranges in an overlapping manner. The portion that is included in the shooting ranges in an overlapping manner is also referred to as an overlapping portion. In each of the first user image 30A and the second user image 30B, an area in which the overlapping portion of the user is captured is indicated as an overlapping area 32, which is surrounded by a dashed frame. The other portion of the user than the overlapping portion is also referred to as a non-overlapping portion. In each of the first user image 30A and the second user image 30B, an area in which the non-overlapping portion of the user is captured corresponds to an area other than the overlapping area 32.

The respective shooting ranges of the first and second imagers 14A and 14B are set so that the shooting ranges include different parts of the non-overlapping portion. For example, when the shooting range of the first imager 14A is set to include the overlapping portion and a first non-overlapping portion of the user, the shooting range of the second imager 14B is set to include the overlapping portion and a second non-overlapping portion of the user that does not overlap the first non-overlapping portion. In each of the first user image 30A in FIG. 3A and the second user image 30B in FIG. 3B, an area that images the overlapping portion of the user corresponds to the overlapping area 32. In the first user image 30A in FIG. 3A, an area that images the first non-overlapping portion of the user corresponds to an area over the eyebrows, which is not included in the overlapping area 32. In the second user image 30B in FIG. 3B, an area that images the second non-overlapping portion of the user corresponds to an area under the chin, which is not included in the overlapping area 32.

<Composition of Images>

The controller 11 of the information processing apparatus 10 analyzes each of the first user image 30A and the second user image 30B. The controller 11 may, for example, extract a feature part, such as eyes, nose, mouth, ears, eyebrows, or head hair, from the user's face in each image. The controller 11 may, for example, extract a feature part, such as a hand, foot, head or torso, from the user's body in each image. The controller 11 may detect the position or orientation of each extracted part. The controller 11 may detect each part of the user's face or body as skeletal information including bones or joints.

The controller 11 detects the overlapping area 32, as an area that overlaps between the first user image 30A and the second user image 30B. The controller 11 may detect the overlapping area 32 between the first user image and the second user image 30B based on extraction results of the feature part of the user. The controller 11 may detect the overlapping area 32 by a partial comparison between the first user image 30A and the second user image 30B.

The controller 11 generates an image including the entire range that is intended to image the user as a subject, by compositing the first user image and the second user image 30B so as to overlap the overlapping area 32 each other. Specifically, the controller 11 trims the first user image 30A and/or the second user image 30B along a line located within the overlapping area 32.

The controller 11 removes, from the second user image 30B, a portion of the overlapping area 32 that remains in the first user image 30A by trimming, and removes, from the first user image 30A, a portion of the overlapping area 32 that remains in the second user image 30B by trimming. The controller 11 merges the trimmed first user image 30A and second user image 30B to generate a single composite image of the first user image 30A and the second user image 30B.

<Determination of Line to Trim Image>

The controller 11 determines the line to trim the images based on analysis results of the images. A virtual line determined by the controller 11 as a line to trim the images is illustrated in each of FIGS. 3A and 3B as a double-dashed virtual line 34.

The controller 11 determines the virtual line 34 so that distortion of a merged portion between the first user image 30A and the second user image 30B is reduced. For example, when the virtual line 34 is located to divide the user's nose into upper and lower sections, distortion of the nose can appear larger in a composite image of the first user image 30A and the second user image 30B. Therefore, the controller 11 may determine the virtual line 34 so as not to divide a single coherent portion.

The controller 11 may determine the virtual line 34 based on various features such as the position or shape of each part of the user extracted from the user's image. In other words, the controller 11 may detect the position of a feature point of the user, as a subject in the overlapping area 32, and determine the virtual line 34 based on the position of the feature point.

The controller 11 may, for example, determine a line passing through the user's chin or an area below the chin, as the virtual line 34. The controller 11 may, for example, determine a line passing through an area between the bottom of the user's nose and the user's mouth, or a line passing a predetermined distance below the bottom of the user's nose, as the virtual line 34. The controller 11 may, for example, determine a line passing through an area between the user's eyebrows and head hair, i.e., the user's forehead, or a line passing a predetermined distance above the user's eyebrows, as the virtual line 34. When the user is wearing a mask, the controller 11 may, for example, determine a line passing through at least part of the top or bottom end of the mask, as the virtual line 34. The controller 11 may determine the virtual line 34 in the entirety of the user's image or only in the overlapping area 32.

In each of FIGS. 3A and 3B, the virtual line 34 is illustrated as a straight line, but may be configured as a curve or as a broken line containing multiple line segments.

Figure 3C:
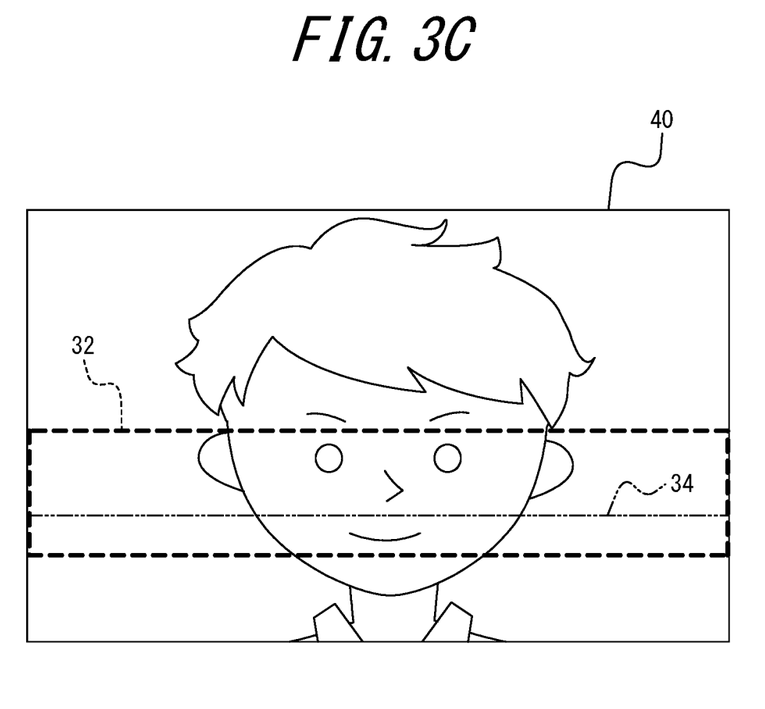
FIG. 3C is a diagram illustrating an example of a composite image of the user images in FIGS. 3A and 3B.

When the entirety of the determined virtual line 34 is located within the overlapping area 32, the controller 11 trims the first user image 30A or the second user image 30B at the virtual line 34. The controller 11 merges the first user image 30A and the second user image 30B that are trimmed at the virtual line 34, at the trimmed line to generate a composite image 40 as illustrated in FIG. 3C. In the composite image 40 illustrated in FIG. 3C, the overlapping area 32 and the virtual line 34 are indicated. The virtual line 34 illustrated in FIGS. 3A, 3B, and 3C is determined as a line passing through an area between the bottom of the user's nose and the user's mouth. By determining the virtual line 34 that does not divide a coherent portion such as the nose or mouth, distortion of the user's face in the composite image 40 can be reduced.

When only a part of the determined virtual line 34 is located within the overlapping area 32, the controller 11 may trim the image along a line connecting the virtual line 34 located within the overlapping area 32 and a contour line of the overlapping area 32. When the entirety of the determined virtual line 34 is not located within the overlapping area 32, the controller 11 may trim the image along the contour line of the overlapping area 32. In other words, when at least part of the determined virtual line 34 is not located within the overlapping area 32, the controller 11 may trim the image along a line that includes the contour line of the overlapping area 32.

When the virtual line 34 is not present within the overlapping area 32 but only outside the overlapping area 32, the controller 11 may suggest a move to the user so that the virtual line 34 is located within the overlapping area 32. The amount of movement required in this case can be reduced, as compared to when the entire range that is intended to image the user as a subject is contained within the shooting range of only one imager 14. In other words, the degree of freedom of the position of the user when generating an image capturing the entire range that is intended to image the user as a subject can be increased.

The controller 11 may re-determine the virtual line 34 each time the user moves. For example, the controller 11 may re-determine the virtual line 34 for each frame or multiple frames of a video of the user. In other words, the controller 11 may dynamically change the virtual line 34. This can reduce distortion of the subject even when the subject moves.

Even when merging three or more images, the controller 11 may detect areas in which the respective images overlap, determine a virtual line 34 for each overlapping area, trim the images at the positions of the virtual lines 34 to composite the images into a single image.

<Example Procedure for Information Processing Method>

As described above, the information processing apparatus 10 according to the present embodiment composites multiple images that capture a user as a subject and displays a composite image. The controller 11 of the information processing apparatus 10 may perform an information processing method including the procedures of the flowchart in FIG. 4, for example. The information processing method may be implemented as an information processing program to be executed by the controller 11. The information processing program may be stored on a non-transitory computer readable medium.

Figure 4:
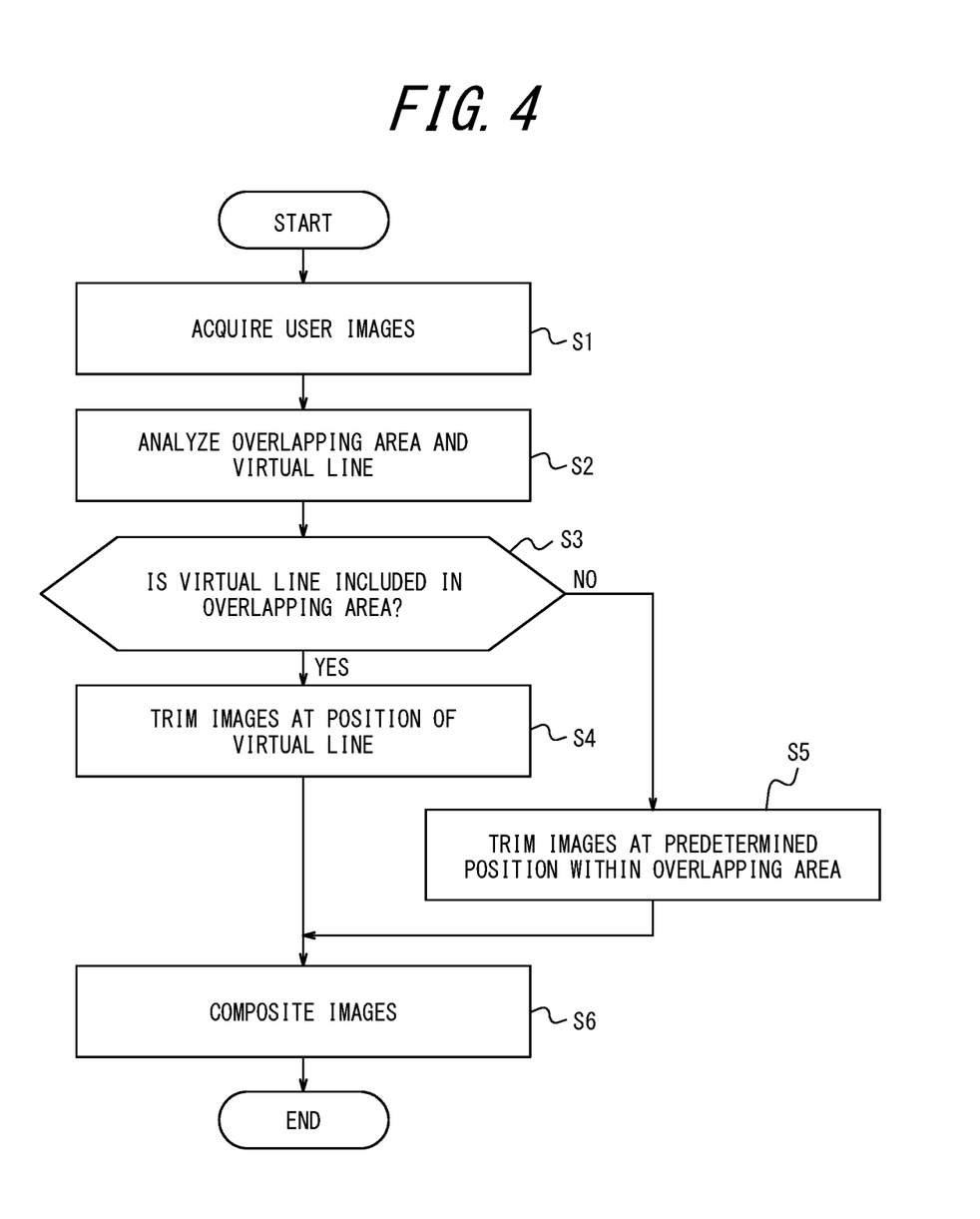
FIG. 4 is a flowchart illustrating an example procedure for an information processing method according to the embodiment.

The controller 11 acquires a first user image 30A and a second user image 30B (step S1). The controller 11 analyzes an overlapping area 32 and a virtual line 34 in the first user image 30A and the second user image 30B (step S2).

The controller 11 determines whether the virtual line 34 is included in the overlapping area 32 (step S3). When the virtual line 34 is included in the overlapping area 32 (YES in step S3), the controller 11 trims the first user image 30A and the second user image 30B at the position of the virtual line 34 (step S4). When the virtual line 34 is not included in the overlapping area 32 (NO in step S3), the controller 11 trims the first user image 30A and the second user image 30B at a predetermined position set appropriately within the overlapping area 32 (step S5).

After performing the trimming process of step S4 or S5, the controller 11 composites the trimmed first user image 30A and second user image 30B to generate a composite image 40 (step S6). After performing the process of step S6, the controller 11 ends the execution of the procedure in the flowchart of FIG. 4.

<Summary>

As described above, the information processing apparatus 10 according to the present embodiment merges multiple images at a virtual line 34 determined within an overlapping area 32 to generate a single composite image 40. This can reduce distortion of a subject's face, body, or the like in the composite image 40. In other words, distortion of the subject in a merged portion of the composite image 40 can be reduced. The information processing apparatus 10 can also determine the virtual line 34 based on a feature point of the subject. In other words, the information processing apparatus 10 can dynamically change the virtual line 34 to be used for trimming. This can reduce distortion of the subject even when the subject moves.

Another Embodiment

An example configuration of the information processing apparatus 10 according to another embodiment will be described below.

<Display of Three-Dimensional Image>

The information processing apparatus 10 may capture RGB and depth images of a user with the imager 14 and display a stereoscopic image i.e. three-dimensional image of the user. Specific operations for displaying the stereoscopic image will be described below.

The imager 14 of the information processing apparatus 10 captures an RGB image of at least a part of a body of a user, and generates a depth image by measuring distances to portions of at least the part of the body of the user. The depth image may be represented as a distance map with multiple pixels. In the distance map, a measurement result of a distance to a portion corresponding to each pixel is associated with each pixel. The number and arrangement of pixels in the depth image may match or differ from the number and arrangement of pixels in the RGB image.

The controller 11 of the information processing apparatus 10 generates a stereoscopic image of the user based on the depth image. The controller 11 may generate three-dimensional polygon data on the user based on the depth image, and render the RGB image onto respective polygons constituting the three-dimensional polygon data to generate the stereoscopic image. The controller 11 may generate voxel data on the user based on the depth image, and assign each pixel of the RGB image to each voxel to generate the stereoscopic image. In other words, the controller 11 may generate the stereoscopic image of the user by mapping the RGB image to three-dimensional data on the user. Not limited to these, the controller 11 may generate the stereoscopic image of the user in various ways.

The controller 11 may use a first user image 30A and a second user image 30B as RGB images to be rendered to the three-dimensional polygon data on the user. In this case, the controller 11 may trim the first user image and the second user image 30B to fit some polygon joints in the three-dimensional polygon data. Specifically, the controller 11 may determine a virtual line 34 when trimming the first user image 30A and the second user image 30B as a line along the contour of a polygon rendering the image.

The controller 11 may use a first user image 30A and a second user image 30B as RGB images to be assigned to the voxel data on the user. In this case, the controller 11 may trim the first user image 30A and the second user image 30B to connect portions (sharply curved portions) with small radii of curvature on a surface of the voxel data on the user, as a boundary. Specifically, the controller 11 may calculate the radius of curvature at each portion on a surface averaging voxel-by-voxel irregularities on the surface of the voxel data on the user, and trim the images to merge the multiple images at positions at which the radii of curvature are less than a predetermined value. In other words, the controller 11 may determine the virtual line 34 when trimming the first user image 30A and the second user image 30B as a line containing the positions at which the radii of curvature are less than the predetermined value.

As described above, the controller 11 may generate a stereoscopic image of a user as a subject by mapping a composite image 40 to three-dimensional data on the user.

While embodiments of the present disclosure have been described with reference to the drawings and examples, it is to be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

The invention claimed is:

1. An information processing method executed by a controller having at least one processor, the method comprising:

for each of multiple images having an overlapping area with each other, the multiple images being obtained by capturing a subject with respective multiple imagers having shooting ranges that overlap each other in part, detecting a position of a feature point of the subject in the overlapping area;

defining a virtual line that passes through the overlapping area, the virtual line being defined based on the position of the feature point of the subject detected for each of the multiple images in the overlapping area;

trimming, at a position of the virtual line, a portion of each of the multiple images so that after the trimming the multiple images no longer overlap; and merging the multiple images after the trimming to generate a single composite image.

2. The information processing method according to claim 1, further comprising:

acquiring a depth image of the subject;

generating three-dimensional data on the subject based on the depth image; and mapping the composite image to the three-dimensional data on the subject.

3. The information processing method according to claim 1, wherein the virtual line is defined so that the virtual line does not divide any single coherent portion of the subject of the image.

4. The information processing method according to claim 1, wherein the virtual line is defined so that when the subject includes a face of a person:

the virtual line passes through an area between a bottom of the subject's nose and a top of the subject's mouth located in the overlapping area, or the virtual line passes through an area between a top of the subject's eyebrows and a bottom of the subject's head hair on the subject's forehead located in the overlapping area.

5. The information processing method according to claim 1, wherein when the controller is unable to define the virtual line within the overlapping area, the controller issues an instruction for the subject to move so that the virtual line can be defined within the overlapping area of additional images obtained by the respective multiple imagers.

6. An information processing apparatus comprising:

multiple imagers having shooting ranges that overlap each other in part and that are respectively configured to capture multiple images having an overlapping area with each other; and a controller configured to:

for each of the multiple images captured by the respective multiple imagers, detect a position of a feature point of a subject in the overlapping area;

define a virtual line that passes through the overlapping area, the virtual line being defined based on the position of the feature point of the subject detected for each of the multiple images in the overlapping area;

trim, at a position of the virtual line, a portion of each of the multiple images so that after the trimming the multiple images no longer overlap; and merge the multiple images after the trimming to generate a single composite image.

7. The information processing apparatus according to claim 6, wherein the controller defines the virtual line so that the virtual line does not divide any single coherent portion of the subject of the image.

8. The information processing apparatus according to claim 6, wherein the controller defines the virtual line so that when the subject includes a face of a person:

the virtual line passes through an area between a bottom of the subject's nose and a top of the subject's mouth located in the overlapping area, or the virtual line passes through an area between a top of the subject's eyebrows and a bottom of the subject's head hair on the subject's forehead located in the overlapping area.

9. The information processing apparatus according to claim 6, wherein when the controller is unable to define the virtual line within the overlapping area, the controller issues an instruction for the subject to move so that the virtual line can be defined within the overlapping area of additional images obtained by the respective multiple imagers.

* * * * *